(12) United States Patent
Hayakawa (10) Patent No.: US 9,174,527 B2
(45) Date of Patent: Nov. 3, 2015

(54) ELECTRIC GRILL SHUTTER CONTROL DEVICE

(71) Applicant: Shunsuke Hayakawa, Obu (JP)

(72) Inventor: Shunsuke Hayakawa, Obu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/221,959

(22) Filed: Mar. 21, 2014

(65) Prior Publication Data

US 2014/0288788 A1    Sep. 25, 2014

(30) Foreign Application Priority Data

Mar. 25, 2013   (JP) ................................. 2013-063060

(51) Int. Cl.
*B60R 22/00* (2006.01)
*E05F 15/00* (2015.01)
*G05D 1/00* (2006.01)
*G05D 3/00* (2006.01)
*G06F 17/00* (2006.01)
*B60K 11/08* (2006.01)

(52) U.S. Cl.
CPC .................................... *B60K 11/085* (2013.01)

(58) Field of Classification Search
CPC ...... B60K 11/085; B60K 11/08; B60K 11/04; B60K 11/02; B60K 26/021; B60K 31/0008; G01D 3/0365; G01D 5/145; G01D 3/022; G01D 3/02
USPC ........ 701/29.2, 29.1, 30.1, 49, 45, 41, 36, 46, 701/1, 70, 96; 180/2.1, 68.2, 65.31, 68.6, 180/273, 171
See application file for complete search history.

(56) References Cited

U.S. PATENT DOCUMENTS

| | | | | |
|---|---|---|---|---|
| 5,566,745 A * | 10/1996 | Hill et al. | ........................ | 165/299 |
| 5,977,732 A * | 11/1999 | Matsumoto | ................... | 318/283 |
| 6,753,680 B2 * | 6/2004 | Wolf | ........................ | 324/207.2 |
| 7,219,563 B2 * | 5/2007 | Saito | ........................ | 73/862.331 |
| 7,301,328 B2 * | 11/2007 | Babin | ........................ | 324/207.2 |
| 7,304,472 B2 * | 12/2007 | Ramsden | ................. | 324/207.25 |
| 7,504,792 B2 * | 3/2009 | Pellarin et al. | ................. | 318/466 |
| 8,311,708 B2 * | 11/2012 | Kerns | ............................... | 701/49 |
| 8,316,974 B2 * | 11/2012 | Coel et al. | .................... | 180/68.1 |
| 8,505,660 B2 * | 8/2013 | Fenchak et al. | .............. | 180/68.1 |
| 8,517,130 B2 * | 8/2013 | Sakai | ............................ | 180/68.1 |
| 8,561,738 B2 * | 10/2013 | Charnesky et al. | .......... | 180/68.1 |
| 8,645,028 B2 * | 2/2014 | Mochizuki | ...................... | 701/49 |
| 8,655,545 B2 * | 2/2014 | Yu et al. | ........................... | 701/36 |
| 8,662,569 B2 * | 3/2014 | Klop | .......................... | 296/193.1 |

(Continued)

FOREIGN PATENT DOCUMENTS

JP    2011-105219 A    6/2011

*Primary Examiner* — Calvin Cheung
*Assistant Examiner* — Luis A Martinez Borrero
(74) *Attorney, Agent, or Firm* — Dinsmore & Shohl LLP (57) ABSTRACT

An electric grill shutter control device includes: a control portion that performs an energization of a motor that drives a movable member that configures the electric grill shutter; a detection portion that detects a rotational speed of the motor; a determination portion that determines whether locking of the movable member is occurred based on whether the energization is performed and the rotational speed; and an identification portion that obtains a rotation amount of the motor in a period around the locking from the rotational speed in a case where the locking occurs and identifying a cause of the locking according to the rotation amount and the energization.

6 Claims, 7 Drawing Sheets

(56) References Cited

U.S. PATENT DOCUMENTS

| | | | | |
|---|---|---|---|---|
| 8,733,484 B1* | 5/2014 | Klop | | 180/68.1 |
| 8,794,360 B2* | 8/2014 | Nemoto | | 180/68.1 |
| 8,919,470 B2* | 12/2014 | Hori | | 180/68.1 |
| 9,031,748 B2* | 5/2015 | Sakai | | 701/49 |
| 2005/0288840 A1* | 12/2005 | Suzuki | | 701/49 |
| 2009/0050385 A1* | 2/2009 | Guilfoyle et al. | | 180/68.1 |
| 2010/0243351 A1* | 9/2010 | Sakai | | 180/68.1 |
| 2010/0282533 A1* | 11/2010 | Sugiyama | | 180/68.1 |
| 2011/0118945 A1* | 5/2011 | Mochizukil | | 701/49 |
| 2011/0288717 A1* | 11/2011 | Yu et al. | | 701/29 |
| 2012/0022742 A1* | 1/2012 | Nemoto | | 701/36 |
| 2012/0270490 A1* | 10/2012 | Turner et al. | | 454/75 |

* cited by examiner

ELECTRIC GRILL SHUTTER CONTROL DEVICE

INCORPORATION BY REFERENCE

The disclosure of Japanese Patent Application No. 2013-063060 filed on Mar. 25, 2013 including the specification, drawings and abstract is incorporated herein by reference in its entirety.

BACKGROUND OF THE INVENTION

1. Field of the Invention

The present invention relates to an electric grill shutter control device which is preferably applied to an automobile such as a passenger vehicle, a truck, or a bus.

2. Description of Related Art

An electric grill shutter that controls an opening amount is installed in a front grill of a vehicle in order to appropriately guide cooling air to a cooling fin of an engine. Such an electric grill shutter performs selection of an open position or a close position of a movable member that is capable of opening and closing.

As disclosed in Japanese Patent Application Publication No. 2011-105219 (JP 2011-105219 A), for example, it is suggested that in positional control of the movable member, current is continually applied according to a currently effective action condition until a different action condition is satisfied after an opening action or a closing action is performed, and a correction is made in a case where an actual position of the movable member does not correspond with a position where the movable member should be according to the action condition.

However, the electric grill shutter control device in JP 2011-105219 A may not be able to identify a cause of malfunction because a required opening amount cannot be obtained after the opening action of the movable member is performed. This may occur in a case where the grill shutter is pushed back in a close direction due to a disturbance factor such as jamming by a foreign object, for example. As a result, the unidentified cause leads to unnecessary part replacement at a dealer or the like, for example.

SUMMARY OF THE INVENTION

The present invention provides an electric grill shutter control device which can secure a required opening amount and appropriately identify a cause of malfunction.

An electric grill shutter control device in accordance with an aspect of the present invention includes: a control portion that performs an energization of a motor that drives a movable member that configures the electric grill shutter; a detection portion that detects a rotational speed of the motor; a determination portion that determines whether locking of the movable member is occurred based on whether the energization is performed and the rotational speed; and an identification portion that obtains a rotation amount of the motor in a period around the locking from the rotational speed in a case where the locking occurs and identifying a cause of the locking according to the rotation amount and the energization.

According to the aspect, as a large required opening amount as possible can be secured even if the locking occurs after an opening action, the cause of the locking, that is, malfunction can appropriately be identified, unnecessary part replacement can be prevented, and a cost can thus be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Modes for carrying out the present invention will hereinafter be described with reference to the attached drawings.

(First Embodiment)

Figure 1:
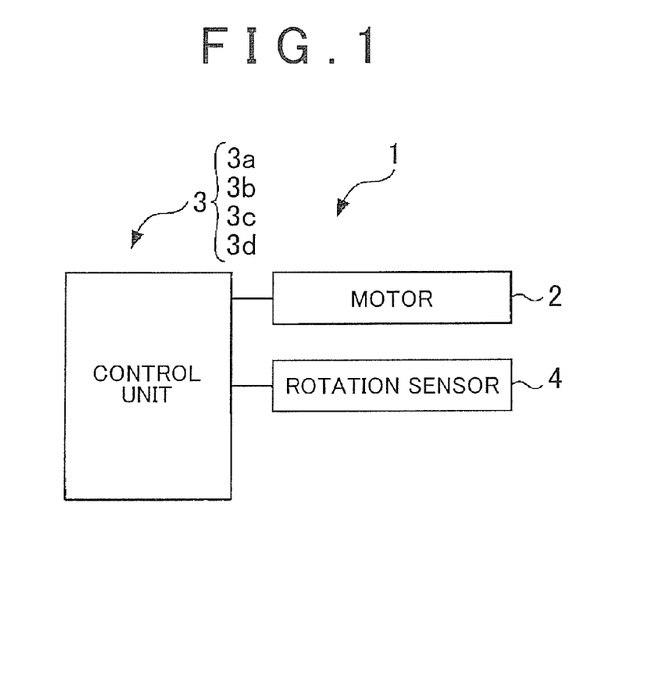
FIG. 1 is a schematic diagram that illustrates an embodiment of an electric grill shutter control device 1 of a first embodiment in accordance with the present invention.

As shown in FIG. 1, an electric grill shutter control device 1 of a first embodiment includes a control unit 3 that energizes a motor 2 and a rotation sensor 4. The control unit 3 is configured with an ECU (Electronic Control Unit), for example, and configured with a CPU, a ROM, a RAM, and a data bus and an input-output interface that connect those together. In the control unit 3, the CPU performs a prescribed process described below according to a program stored in the ROM to configure a control portion 3a, a detection portion 3b, a determination portion 3c, and an identification portion 3d.

The motor 2 is a three-phase brushless direct current motor (motor), for example, and includes a stator configured with bipolar coils in a three-phase Y connection and a rotor with embedded permanent magnets. In the first embodiment, the motor 2 is disposed on a substrate that configures the ECU of the above-described control unit 3.

Figure 2:
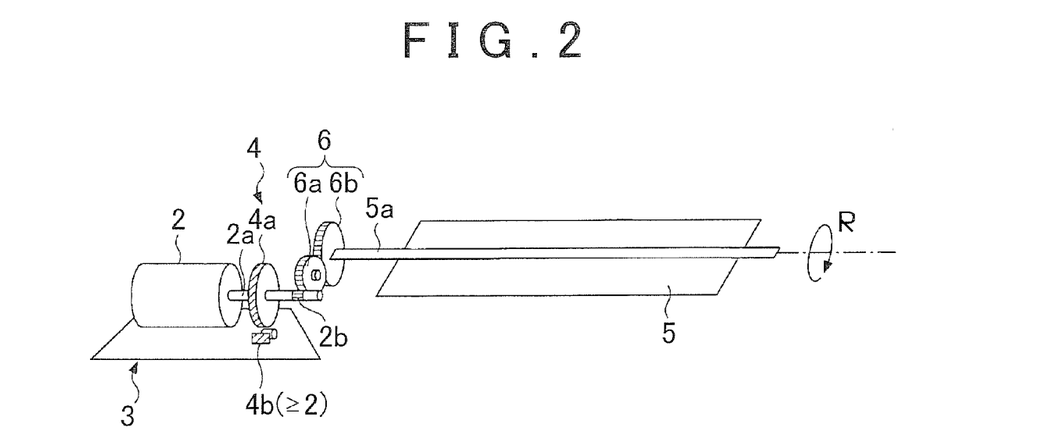
FIG. 2 is a schematic diagram that illustrates an embodiment of a hardware configuration as an object controlled by the electric grill shutter control device 1 of the first embodiment in accordance with the present invention.

As shown in FIG. 2, a disk-shaped magnet 4a for rotation detection is fitted on a rotational shaft 2a of the motor 2 by means of serration or the like, for example. Hall ICs 4b are disposed in two portions in a circumferential direction on an outer peripheral side of the magnet 4a.

A pinion gear 2b is formed in a portion of the rotational shaft 2a that is closer to a distal end than the magnet 4a and meshes with a small gear 6a of a gear mechanism 6 (drive mechanism) for speed reduction. The small gear 6a meshes with a large gear 6b, and drive-transmitting coupling is made between the large gear 6b and a left end portion of a shaft 5a of a shutter fin 5 (movable member) of an electric grill shutter also by means of serration or the like.

An intermediate portion between the left end portion of the shaft 5a of the shutter fin 5 and a right end portion are rotatably supported by a pair of right and left bearings included in an unillustrated casing. An open position of the shutter fin 5 is a position that is parallel to a horizontal plane as shown in FIG. 2, and a close position of the shutter fin 5 is a position in which the shutter fin 5 that is rotated in an R direction in FIG. 2 becomes vertical to the horizontal plane. An opening portion of the unillustrated casing is blocked when the shutter fin 5 is in the close position.

The shutter fin 5 performs reciprocal movement between the open position and the close position according to forward rotation or reverse rotation of the motor 2. The shutter fin 5 is moved from the close position to the open position shown in FIG. 2 according to the forward rotation (R direction) of the motor 2 and moved from the open position shown in FIG. 2 to the close position according to reverse rotation of the motor 2.

The unillustrated casing includes an unillustrated stopper that limits movement of the shutter fin 5 beyond the open position in the forward rotation direction when the shutter fin 5 is moved from the close position to the open position shown in FIG. 2. Similarly, the unillustrated casing includes an unillustrated stopper that limits movement of the shutter fin 5 beyond the close position in the reverse rotation direction when the shutter fin 5 is moved from the open position shown in FIG. 2 to the close position.

Figure 3:
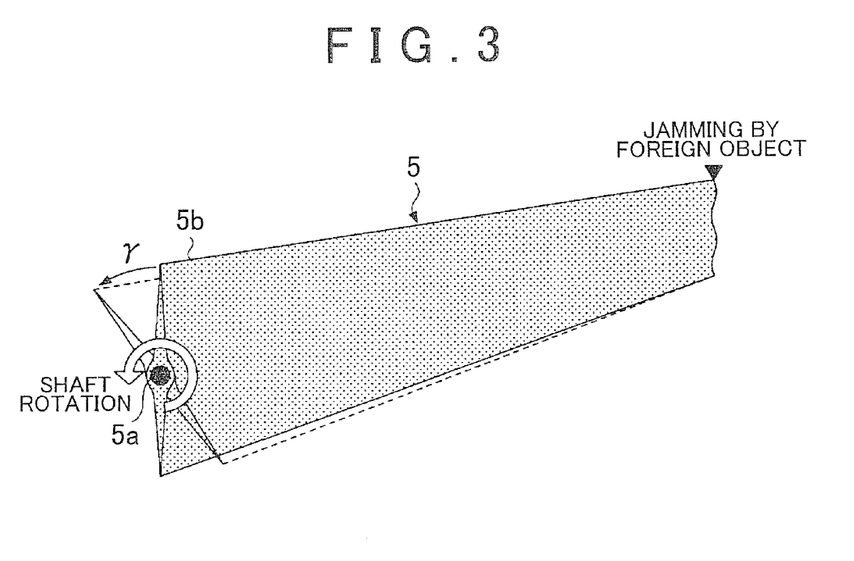
FIG. 3 is a schematic diagram that illustrates the embodiment of the hardware configuration as the object controlled by the electric grill shutter control device 1 of the first embodiment in accordance with the present invention.

In consideration of installation of the shutter fin 5 on a front side of a vehicle and jamming by a foreign object carried by a stream caused by travel, an edge portion 5b on a radial outside is configured to be capable of bending in the circumferential direction with respect to the shaft 5a as indicated by a symbol γ in FIG. 3. That is, the shutter fin 5 may be an integrally molded resin part or a metal part and is flexible such that the edge portion 5b is displaceable in the circumferential direction with respect to the shaft 5a.

The control unit 3 includes a known inverter having transistors that are combined in two columns and three rows, and the control unit 3 executes energization of the motor 2 corresponding to the forward rotation or the reverse rotation via the inverter on the basis of PWM control, for example.

The Hall IC 4b includes a Hall element that is formed with a plate-shaped thin film in a thickness of several μm of a semiconductor of a III to V group compound such as InSb, InAs, or GaAs, for example. The Hall element is configured such that a voltage is applied in a direction parallel to the plate-shape thin film and both terminals are drawn out from both end surfaces in a vertical direction to the direction in which the voltage is applied. When a magnetic field is applied in a thickness direction of the plate-shaped thin film, the Hall element generates a voltage between both of the terminals on the basis of the Hall effect.

The voltage generated by the Hall element is proportional to a magnetic flux in the thickness direction of the thin film of the plate-shaped semiconductor that configures the Hall element. When an angle θ of the plate-shaped Hall element with respect to a direction of a magnetic field of a magnetic flux density B changes along with the rotation of the rotor of the motor 2, the voltage changes in response to the angle θ because a magnetic flux component in the thickness direction of the Hall element is Bcosθ.

More specifically, a voltage V generated by the Hall element is expressed by V=RH/d×Ic×Bcosθ given that the Hall coefficient is RH and the thickness of the Hall element is d. The angle θ corresponds to a rotational angle of the rotor.

Figure 4:
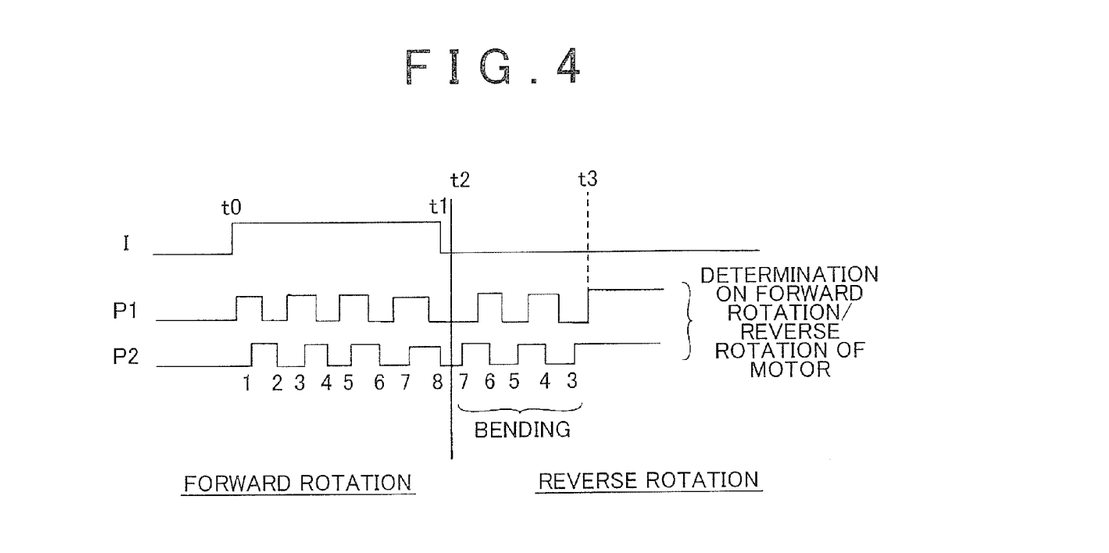
FIG. 4 is a schematic diagram that illustrates specific modes of an energization signal and pulse waveforms that are processed by a control unit 3 included in the electric grill shutter control device 1 of the first embodiment.

That is, as shown in FIG. 2, the Hall ICs 4b are provided in the two portions in the circumferential direction, generate pulses P1, P2 whose phases are offset from each other as shown in FIG. 4 according to a change in the magnetic field that is formed by the magnet 4a along with the change in the rotational angle of the rotor, and output those to the control unit 3. The detection portion 3b of the control unit 3 detects a rotational speed and a rotational direction (forward rotation or reverse rotation) of the motor 2 from pulse numbers of and a phase difference between the two pulses P1, P2. For example, in the forward rotation shown on the left side of the FIG. 4, the pulse number is counted in a positive direction. In the reverse rotation shown on the right side, the pulse number is counted in a negative direction.

The control portion 3a of the control unit 3 rotates the motor 2 forward to move the shutter fin 5 to the open position when cooling of an engine is required, and reversely rotates the motor 2 to move the shutter fin 5 to the close position when cooling is not required according to a cooling water temperature detected by an unillustrated cooling water temperature sensor of the engine and a vehicle speed in basic control.

The determination portion 3c of the control unit 3 makes a determination whether or not locking of the shutter fin 5 has occurred from presence or absence of energization of the motor 2 by the control portion 3a and the rotational speed. The pulses P1, P2 in FIG. 4 show waveforms in a case where the reverse rotation occurs without energization after the energization for the forward rotation is made. In this case, the determination portion 3c detects occurrence of the locking in a case where the pulses cannot be detected for a certain period from a time t1 to a time t2 after the energization for the forward rotation is started at a time to and is terminated at the time t1. In addition, the identification portion 3d obtains a rotation amount of the motor in a period around the occurrence of the locking from the rotational speed in a case where the locking has occurred and identifies a cause of the locking on the basis of the rotation amount and the energization.

Here, the identification portion 3d makes a determination of the forward rotation on the basis of the fact that the phase of the pulse P1 has further proceeded than the phase of the pulse P2 before the time t2 at which the locking occurs and computes a forward rotation amount P from an elapsed time from the time t0 to t1 and the pulse numbers. Further, the identification portion 3d makes a determination of the reverse rotation without energization on the basis of the fact that the phase of the pulse P2 has further proceeded than the phase of the pulse P1 and the energization is absent in a period from the time t2 at which the locking occurs to a time t3 at which the pulse P1 is terminated.

Figure 5:
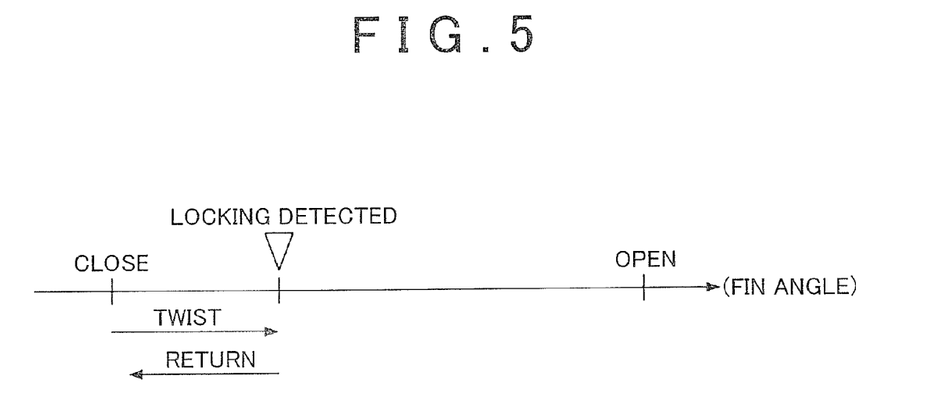
FIG. 5 is a schematic diagram that illustrates an identification process of a cause of locking that is executed by the control unit 3 included in the electric grill shutter control device 1 of the first embodiment.

In other words, as shown in FIG. 5, when the shutter fin 5 is locked along with occurrence of the jamming during the forward rotation from the close position to the open position and the locking is detected, the shutter fin 5 is bent as shown in FIG. 3, and the shaft 5a is thereafter reversely rotated because no torque is generated by the motor 2 due to termination of the energization and energy of bending is released. In the first embodiment, the jamming is detected on the basis of an event of the reverse rotation caused by the bending of the shutter fin 5 without the energization when the jamming occurs.

In other words, the rotation amount includes the forward rotation amount P and a reverse rotation amount N in the first embodiment. That is, the identification portion 3d computes the forward rotation amount P before the locking at the time t2 and the reverse rotation amount N after the locking from the rotational speed, the rotational directions (forward rotation and reverse rotation) and elapsed times (t0 to t1 and t2 to t3 )

and computes a ratio N/P obtained by dividing the reverse rotation amount N by the forward rotation amount P.

The identification portion $3d$ identifies the cause of the locking as the jamming by a foreign object between the shutter fin 5 and the casing when the ratio N/P between the reverse rotation amount N and the forward rotation amount P is in a prescribed range (for example, $1-\delta \leq N/P \leq 1$). Here, it can be assumed that the reverse rotation amount (return amount) of the reverse rotation after the forward rotation due to the occurrence of the jamming is substantially equal to the forward rotation amount P as shown in FIG. 5. Accordingly, the prescribed range is a range in which the forward rotation amount can be assumed to be equal to the reverse rotation amount, and the term $\delta$ ($<1$) serves as a value that can include dispersion where N<P is normally hold due to friction with respect to a value 1 meaning that the rotation amounts P and N are equal to each other. The term $\delta$ is an arbitrary value and can be set to 0.1, 0.2, for example.

In a case where the identification portion $3d$ identifies the cause of the locking as the jamming by a foreign object, the control portion $3a$ of the control unit 3 makes control to continue the energization of the motor 2 and maintain as a large gap (i.e. opening) as possible between the opening portion of the casing and the shutter fin 5 even in a state where the shutter is jammed by a foreign object.

Figure 6:
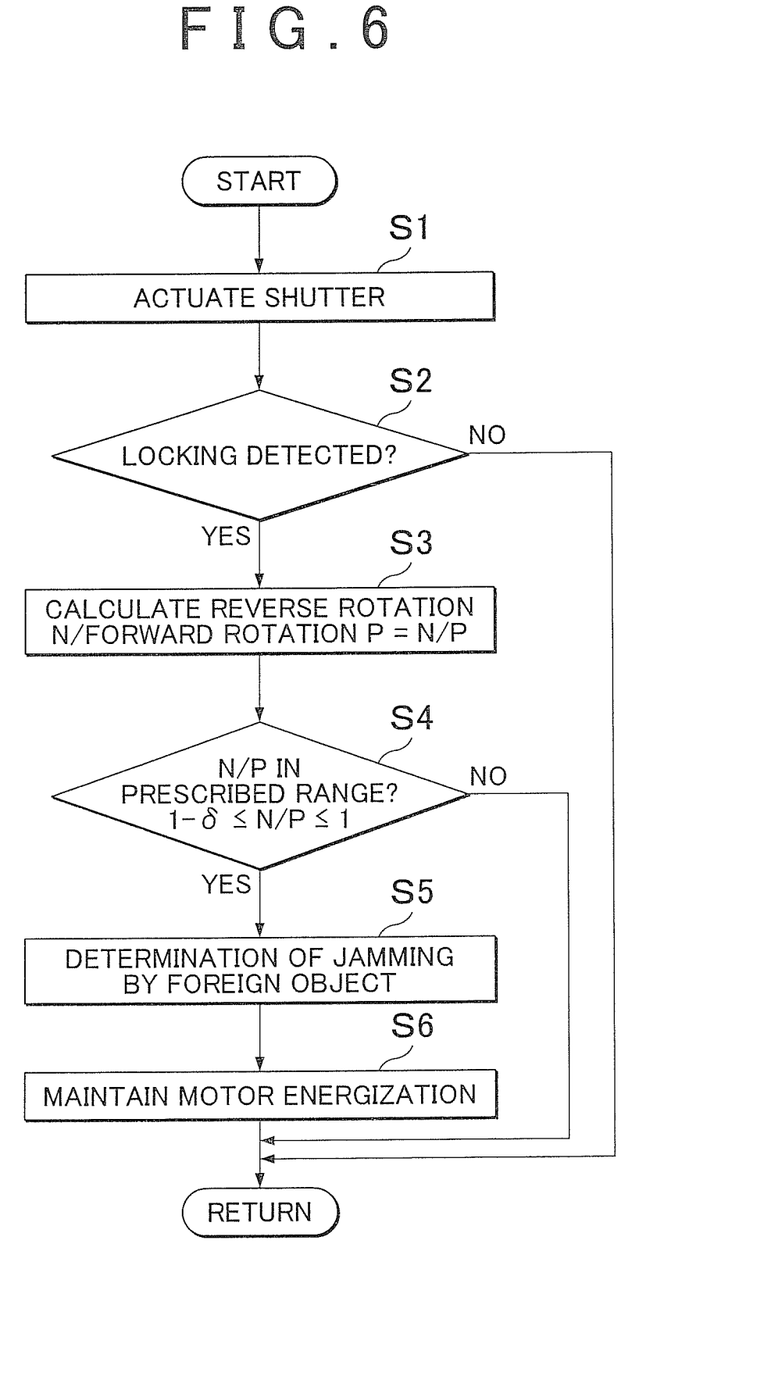
FIG. 6 is a flowchart that illustrates a specific mode of a control content of the electric grill shutter control device 1 of the first embodiment.

A control content of the electric grill shutter control device 1 of the embodiment will hereinafter be described with reference to a flowchart of FIG. 6. As indicated by step S1 in FIG. 6, the control portion $3a$ performs normal control in which the shutter fin 5 is made an open state in a case where cooling is required or is made a close state in a case where cooling is not required according to the cooling water temperature of the engine and the vehicle speed.

Next, in step S2, the determination portion $3c$ makes a determination whether or not the locking has occurred when the shutter fin 5 changes from the close state to the open state by an above-described method according to the rotational speed of the motor 2 that is detected by the detection portion $3b$ and presence or absence of the energization. The process proceeds to step S7 if an affirmative determination is made or proceeds to a step before RETURN if a negative determination is made.

In step S3, the identification portion $3d$ computes the forward rotation amount P and the reverse rotation amount N in a period around the occurrence of the locking to compute the ratio N/P. In step S4, the identification portion $3d$ makes a determination whether or not the ratio N/P is in the prescribed range ($1-\delta \leq N/P \leq 1$). The process proceeds to step S5 if an affirmative determination is made or proceeds to step S8 if a negative determination is made.

In step S5, the identification portion $3d$ makes a determination of identification of the cause of the locking as the jamming by a foreign object and informs a user of the identification by appropriately using an unillustrated display and indicator. In step S6, the control portion $3a$ makes control for maintaining the energization of the motor 2.

The electric grill shutter control device 1 of the first embodiment described above can provide a function and an effect described below.

That is, when the shutter fin 5 is locked due to the jamming by a foreign object, the energization for a shift from the close state to the open state is continued to maintain as a large opening as possible and secure ventilation to the engine.

Overheating of the engine can thereby be hindered. Further, the cause of the locking of the shutter fin 5 can be identified as the jamming by a foreign object. Therefore, for example, the identification result in step S5 is stored and appropriately displayed to advise the user to remove the foreign object himself/herself or at a dealer, and unnecessary part replacement can thus be reduced.

(Second Embodiment)

A description is made about a case where the cause of the locking is identified as the jamming by a foreign object in the above-described first embodiment. However, a more specific case analysis is performed to identify other causes, and corresponding control can thereby be executed. A second embodiment for such a case will hereinafter be described.

Figure 7:
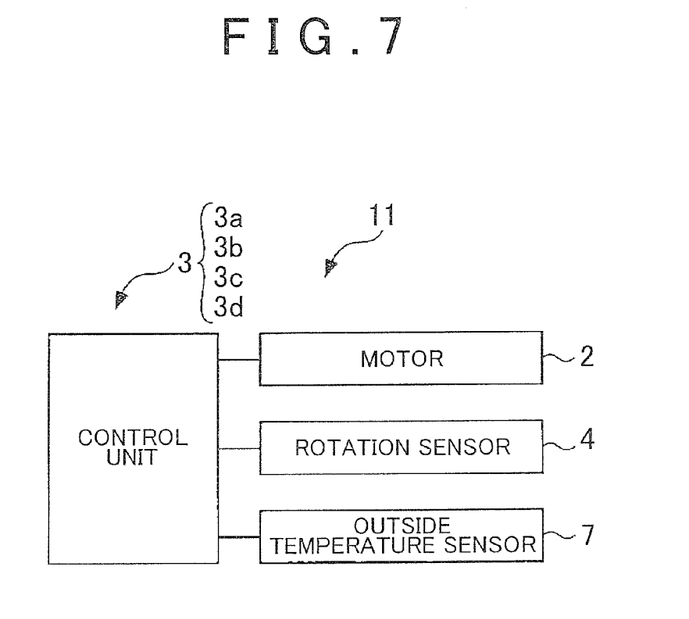
FIG. 7 is a schematic diagram that illustrates an embodiment of an electric grill shutter control device 11 of a second embodiment in accordance with the present invention.

An electric grill shutter control device 11 of the second embodiment is shown in FIG. 7. The electric grill shutter control device 11 in FIG. 7 mainly differs from the control device described in the first embodiment in a point that an outside temperature sensor 7 (outside temperature detection portion) is added. In the electric grill shutter control device 11 of the second embodiment, similarly to the electric grill shutter control device 1 of the first embodiment, the identification portion $3d$ identifies the cause of the locking as the jamming by a foreign object in the shutter fin 5 in a case where the rotation amount computed by the identification portion $3d$ includes the forward rotation amount P and the reverse rotation amount N and the ratio N/P between the reverse rotation amount N and the forward rotation amount P is in the prescribed range. Meanwhile, the identification portion $3d$ identifies the cause of the locking as backward rotation due to an external force by a collision of a foreign object to the shutter fin 5 in a case where the ratio N/P is not in the prescribed range.

Further, the second embodiment includes the outside temperature sensor 7 that detects an outside temperature T. The identification portion $3d$ identifies the cause of the locking as a freeze of the shutter fin 5 in a case where the rotation amount includes only the forward rotation amount before the locking, the forward rotation amount is a prescribed amount PN or smaller, and the outside temperature T is a prescribed temperature TN or lower.

Further, in the second embodiment, the identification portion $3d$ can identify the cause of the locking as sticking of the motor 2, the shutter fin 5, or the gear mechanism 6 between the motor 2 and the shutter fin 5 in a case where the outside temperature T is not the prescribed temperature TN or lower. In the second embodiment also, the control portion $3a$ selects a control content according to the cause of the locking identified by the identification portion $3d$.

The control portion $3a$ again performs the energization for the shift from the close state to the open state of the shutter fin 5 in a case where the identification portion $3d$ identifies the cause of the locking as the backward rotation due to external force. That is, the control portion $3a$ retries the opening action.

The control portion $3a$ finishes the control without continuing the energization or retrying the opening action in a case where the cause of the locking is identified as the freeze. Further, the control portion $3a$ performs a caution indication by an unillustrated indicator or display to advise the user to replace a part at a dealer in a case where the cause of the locking is identified as the sticking.

Figure 8A:
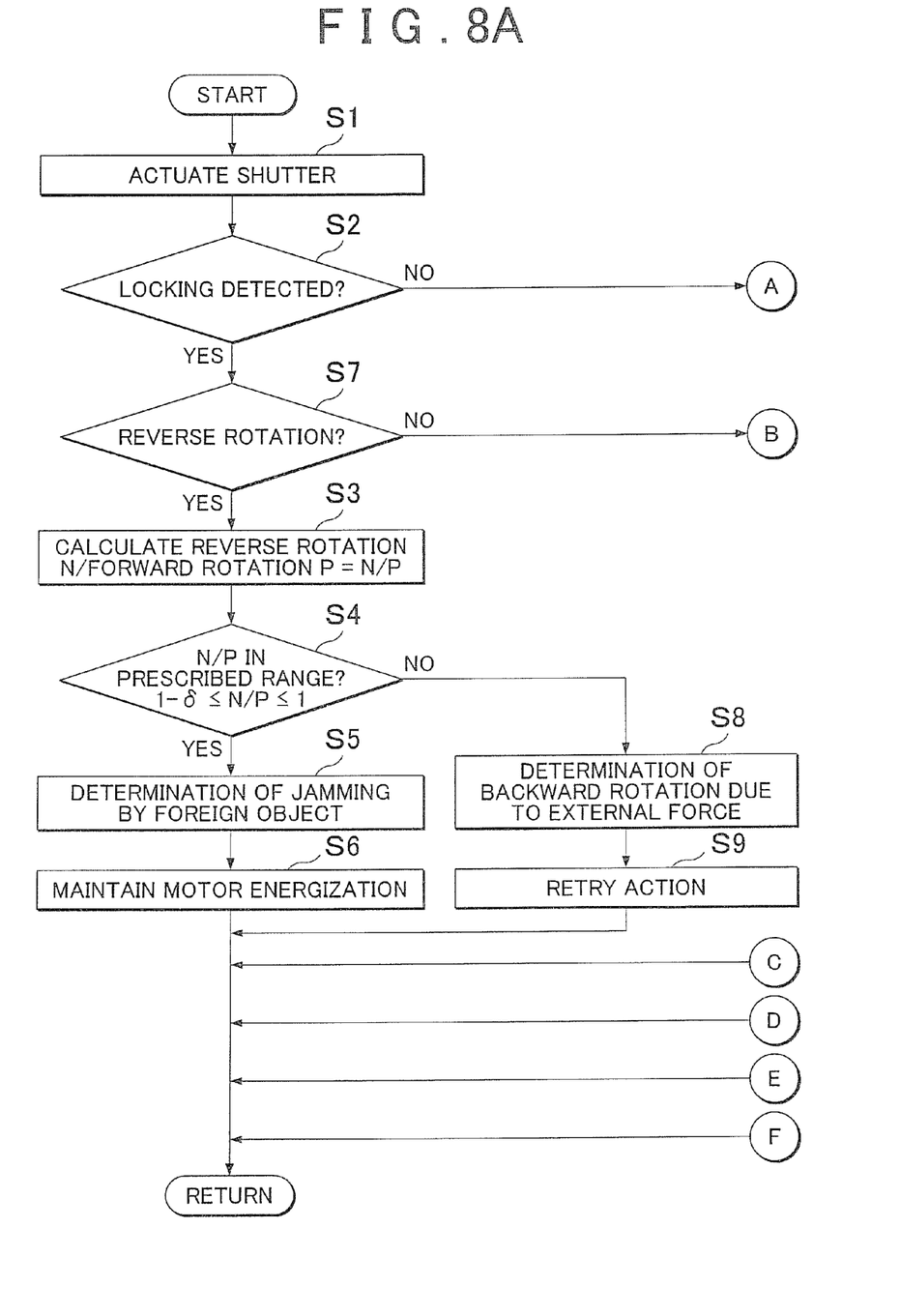
FIG. 8A is a flowchart that illustrates a specific mode of a control content of the electric grill shutter control device 11 of the second embodiment.
Figure 8B:
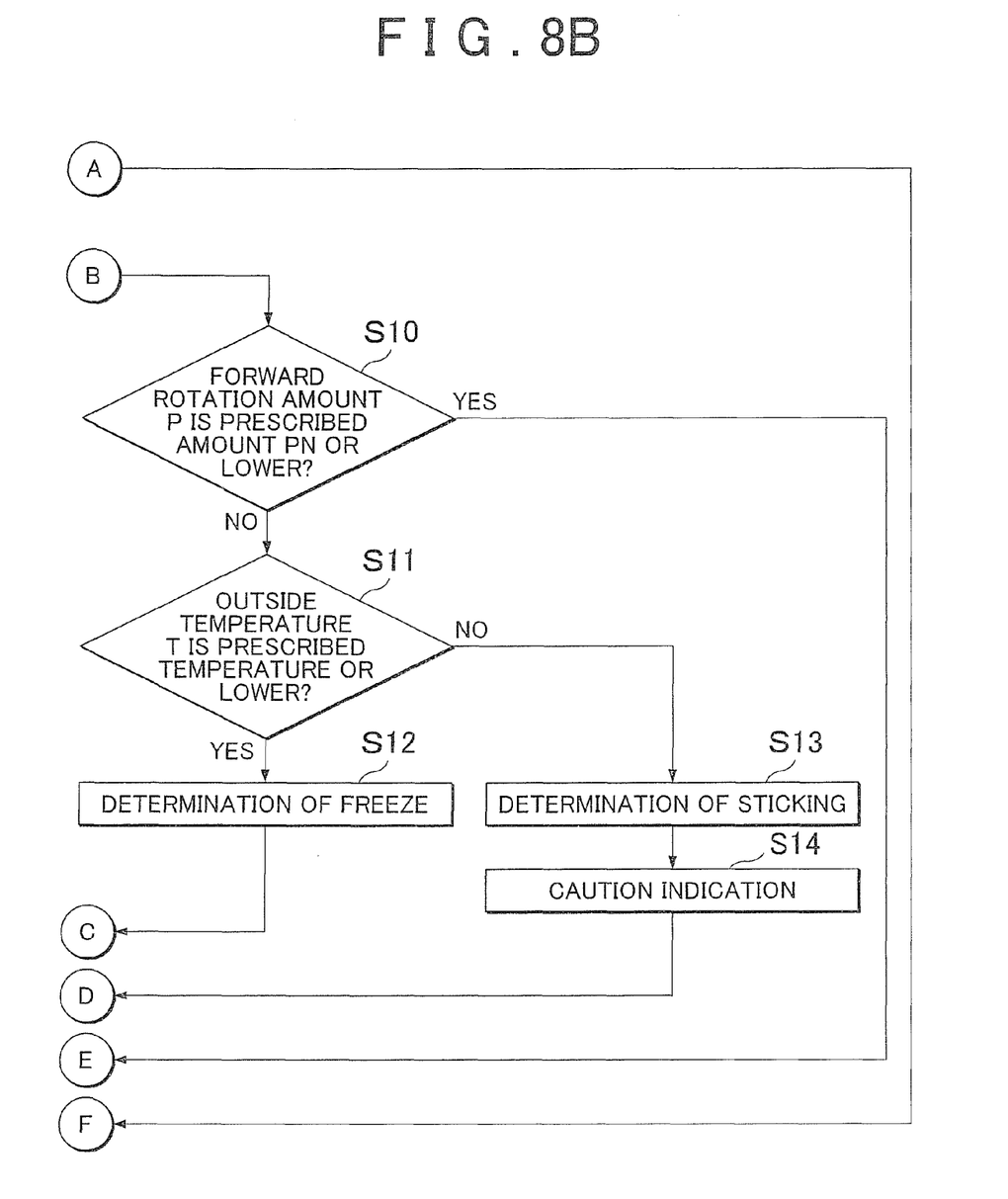
FIG. 8B is a flowchart that illustrates a specific mode of a control content of the electric grill shutter control device 11 of the second embodiment.

The control content of the second embodiment described above will be described with reference to a flowchart shown in FIGS. 8A and 8B. Similarly to the first embodiment, in step S1, the control portion $3a$ performs normal control in which the shutter fin 5 is made the open state in a case where cooling is required or is made the close state in a case where cooling is not required according to the cooling water temperature of the engine and the vehicle speed.

Next, in step S2, the determination portion 3c makes a determination whether or not the locking has occurred when the shutter fin 5 changes from the close state to the open state by the above-described method according to the rotational speed of the motor 2 that is detected by the detection portion 3b and presence or absence of the energization. The process proceeds to step S7 if an affirmative determination is made or proceeds to a step before RETURN if a negative determination is made.

Next, in step S3, the determination portion 3c makes a determination whether or not the rotational speed of the motor 2 that is detected by the detection portion 3b switches from the forward rotation to the reverse rotation. The process proceeds to step S3 if an affirmative determination is made or proceeds to step S10 if a negative determination is made.

In step S3, the identification portion 3d computes the forward rotation amount P and the reverse rotation amount N in the period around the occurrence of the locking to compute the ratio N/P. In step S4, the identification portion 3d makes a determination whether or not the ratio N/P is in the prescribed range $(1-\delta \leq N/P \leq 1)$. The process proceeds to step S5 if an affirmative determination is made or proceeds to step S8 if a negative determination is made.

In step S5, the identification portion 3d makes a determination of identification of the cause of the locking as the jamming by a foreign object. In step S6, the control portion 3a makes the control for maintaining the energization of the motor 2.

In step S10, the identification portion 3d makes a determination whether or not the forward rotation amount P is the prescribed amount PN or smaller. The process proceeds to the step before RETURN if an affirmative determination is made or proceeds to step S11 if a negative determination is made. In step S11, the determination portion 3c makes a determination whether or not the outside temperature T is the prescribed temperature TN or lower. The process proceeds to step S12 if an affirmative determination is made or proceeds to step S13 if a negative determination is made.

In step S12, the identification portion 3d makes a determination of identification of the cause of the locking as the freeze, and the control portion 3a proceeds to RETURN without performing any control corresponding to the freeze. In step S13, the identification portion 3d makes a determination of identification of the cause of the locking as the sticking of a drive system, and in step S14 the control portion 3a performs the caution indication to the user as control corresponding to the sticking.

That is, according to the second embodiment, the causes of the locking other than the jamming by a foreign object that is identified in the first embodiment such as the backward rotation due to the external force, the freeze, and the sticking can be identified. Control according to necessity and a caution in a case where repair is required can appropriately be performed.

In other words, the open state can be secured by a retrial of action because the possibility of reoccurrence of the backward rotation due to external force is low, and trouble due to a retrial of action can be prevented in a case of the freeze. Further, quick repair can be facilitated in a case of the sticking.

Preferable embodiments of the present invention have been described in detail so far. However, it should be noted that the present invention is not limited to the above-described embodiments and that various modifications and substitutions may be made to the above-described embodiments without departing from the scope of the present invention.

For example, the motor 2 is a three-phase brushless direct current motor in the above-described embodiments. However, the motor 2 may be a single-phase brushless motor or another type such as a direct current motor with a brush.

As shown in FIG. 4 and FIG. 5, the above-described embodiments exemplify a case where the identification portion 3d identifies the cause of the locking in a case where the jamming occurs during the forward rotation in the change from the close state to the open state. Such a case is exemplified in consideration of a problem that cooling trouble typically occurs due to the locking at a timing when cooling is required and the change is made from the close state to the open state and the engine overheats. Accordingly, it is of course possible that the cause may be identified similarly in a case where the jamming occurs during the reverse rotation according to the necessity of prevention of excessive cooling or of reduction in air resistance and control may be changed according to the cause. A retrial for managing a frozen state can be conducted when a determination of the freeze is made.

In addition, a form of drive-transmitting coupling between the drive system and the rotational shaft of the rotor of the motor 2 is not limited to an above-described form. For example, drive-transmitting coupling is directly made between the rotational shaft of the motor 2 and the shaft 5a of the shutter fin 5 without interposing a speed reduction mechanism.

The present invention relates to an electric grill shutter control device for a vehicle and can secure a minimum required opening amount to secure engine cooling performance in a case where locking occurs, certainly perform identification of a cause of the locking, and reduce unnecessary part replacement. Accordingly, the present invention is applicable to various vehicles such as passenger vehicles, trucks, and buses having a cooled object such as an engine.

What is claimed is:

1. An electric grill shutter assembly comprising:
an electric grill shutter having a motor that drives a movable member;
a sensor that detects a rotational speed of the motor; and
an electronic control unit configured to:
perform an energization of the motor to drive the movable member between an open position and a closed position;
determine whether locking of the movable member has occurred based on whether the energization is performed and the rotational speed;
obtain a rotation amount of the motor in a period of time around the locking based on the rotational speed upon the determination that locking has occurred; and
identify a cause of the locking according to the rotation amount and the energization.

2. The electric grill shutter assembly according to claim 1, wherein the electronic control unit is configured to identify the cause as jamming by a foreign object in the movable member on the basis of the rotation amount including a forward rotation amount and a reverse rotation amount and a ratio between the reverse rotation amount and the forward rotation amount being in a prescribed range.

3. The electric grill shutter assembly according to claim 2, wherein the electronic control unit is configured to identify the cause as backward rotation of the movable member due to an external force on the basis of the ratio not being in the prescribed range.

4. The electric grill shutter assembly according to claim 3, wherein the electronic control unit is further configured to:
detect an outside temperature; and
identify the cause as a freeze of the movable member on the basis of the rotation amount only including either one of the forward rotation amount and the reverse rotation amount, the rotation amount being a prescribed amount or smaller, and the outside temperature being a prescribed temperature or lower.

5. The electric grill shutter assembly according to claim 4, wherein the electronic control unit is configured to identify the cause as sticking of the motor, the movable member, or a drive mechanism between the motor and the movable member on the basis of the outside temperature not being the prescribed temperature or lower.

6. The electric grill shutter assembly according to claim 1, wherein the control portion selects a control content according to the cause.

* * * * *